Patented Nov. 7, 1933

1,933,775

UNITED STATES PATENT OFFICE 1,933,775

PRODUCTION OF DERIVATIVES OF CRESOL ETHERS

Alexei Ewgenjewitsch Tschitschibabin, Paris, France, assignor to Schering-Kahlbaum A. G., Berlin, Germany No Drawing. Application September 30, 1931, Serial No. 566,174, and in Germany September 30, 1930

2 Claims. (Cl. 260—150)

My invention refers to derivatives of the cresol ethers and more especially to a method of producing the alkyl derivatives.

I have found that olefines will combine with cresol ethers in the presence of inorganic acids with the formation of alkyl derivatives of cresol ethers.

The products obtainable in this manner are particularly suitable for use as starting materials in the production of perfumes.

In practising my invention I may proceed for instance as follows:

Example 1

366 grs. p-cresol methyl ether are mixed by stirring with 2000 grs. sulfuric acid of 60%. Into the suspension thus obtained, which is heated to about 90° C., isobutylene is introduced until the weight has increased by 120 grs. The supernatant oily reaction product is separated from the sulfuric acid, washed with water and subjected to fractional distillation. Besides unchanged p-cresol methyl ether there is obtained a fair yield of tertiary butyl-p-cresol methyl ether boiling at about 226° C.

Example 2

366 grs. o-cresol methyl ether are mixed under vigorous stirring with 180 grs. phosphoric acid (spec. grav. 1, 85). Into this suspension heated to 25° C. isobutylene is introduced until the weight has increased by 120 grs. The supernatant oily reaction product is now separated from the phosphoric acid, washed with water and is then subjected to fractional distillation. Besides unchanged o-cresol methyl ether there is obtained a fair yield of tertiary butyl-o-cresol methyl ether boiling at about 232° C.

Various changes may be made in the details disclosed in the foregoing specification without departing from the invention or sacrificing the advantages thereof.

I claim:—

1. The method of producing alkyl derivatives of methyl ethers of cresols, comprising acting with an olefine on a methyl ether of a cresol in the presence of an inorganic acid of the group consisting of phosphoric acid and sulphuric acid.

2. The method of producing alkyl derivatives of cresol ethers, comprising introducing into a mixture of a cresol methyl ether and a concentrated inorganic acid of the group constituted by phosphoric acid and sulfuric acid isobutylene, separating the supernatant oily reaction product from the acid, washing and subjecting to fractional distillation.

ALEXEI EWGENJEWITSCH
TSCHITSCHIBABIN.